United States Patent Office 2,849,082
Patented Aug. 26, 1958

2,849,082

PROCESS FOR REMOVING CARBON MONOXIDE FROM GASEOUS MIXTURES

Giuseppe Giammarco, Porto Marghera, Italy, assignor to S. p. A. "Vetrocoke," Turin, Italy Application December 6, 1955, Serial No. 551,410

Claims priority, application Italy December 13, 1954

4 Claims. (Cl. 183—115)

It is known that many industrial processes dealing with gaseous mixtures such as for instance the synthesis of ammonia require accurate purification of the gaseous mixture from its carbon monoxide content.

It is known that one of the methods adopted by modern industry consists in washing the gaseous mixtures by means of solutions containing cupro-ammoniacal compounds, which have the property of absorbing carbon monoxide and may be generated by heating whereby the carbon monoxide is expelled.

As is well known the extent of such a purification of the gaseous mixture depends upon the partial pressure of CO contained in the mixture. Consequently, when it is desired to purify the gaseous mixture down to a residual content of 5-20 cc. CO per normal cubic meter, such as is required by up-to-date methods of manufacturing ammonia by catalysis, washing should be effected at a relatively low temperature at a pressure of 80 to 200 atm.

With the present process it becomes possible to purify the gaseous mixture from its carbon monoxide content more thoroughly than heretofore. Inter alia, it is possible by operating at a pressure of 6 to 30 atm. to reach a degree of purity of 5 to 20 cc. carbon monoxide per normal cubic meter of the mixture as normally obtained by employing a pressure of 80 to 200 atm., whereby CO can be removed at the same pressure as currently employed for converting and removing $CO_2$.

The present process consists in employing for washing the gaseous mixture a cupro-ammoniacal solution of one of the known formulae and adding thereto a suitable quantity, as specified hereafter, of one or more organic substances of alcoholic function of either the aliphatic or aromatic series of the carbocyclic or heterocyclic type.

As such the following substances which are largely available and easy to employ on an industrial scale may be mentioned: methyl and ethyl alcohol among monovalent alcohols; glycols and glycerine among polyvalent alcohols which are, more particularly, suitable on account of their low volatility; finally, phenols among substances of an alcoholic nature which belong to the aromatic series.

It has been ascertained that the addition of one of the abovementioned substances of an alcoholic nature brings about a considerable increase in the absorbing power of the solution, such that the ultimate purification of the gaseous mixture is increasingly improved as the percentage of added substances increases.

Figure 1:
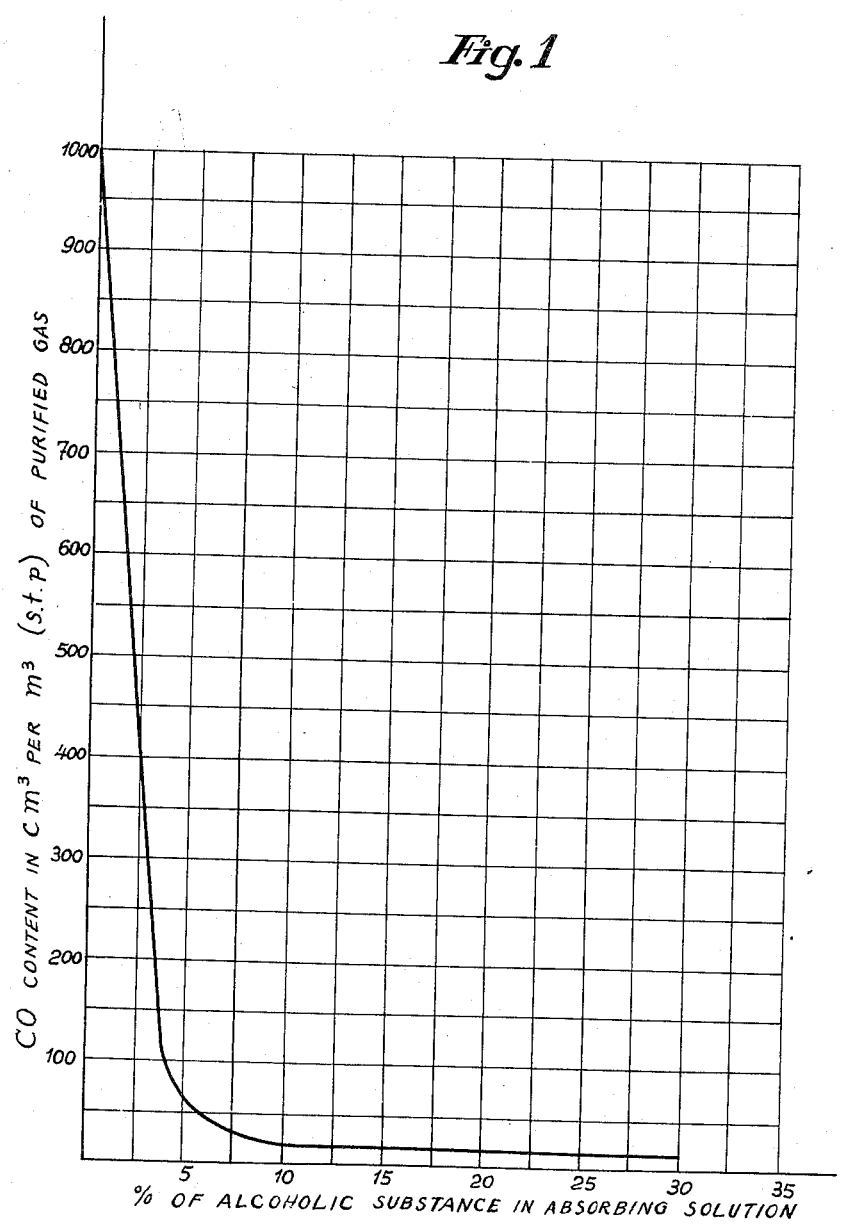

This will be obvious from the diagram shown in Figure 1, in which the glycol percentage in the cupro-ammoniacal solution are given as abscissae, the CO cc. per normal cubic meter at the outlet from absorption being given as ordinates.

The diagram has been derived from experimental data relating to washing carried out at a temperature of about +3° C. at a pressure of 12 atm. of a mixture containing 4% CO with a cupro-ammoniacal solution of the usual type and of the following composition:

Total copper _____ 11-12 g./100 g. of the solution.
Bivalent copper _____ 2.5 g./100 g. of the solution.
Formic acid _____ 7 g./100 g. of the solution.
Ammonia _____ 11-12 g./100 g. of the solution.
Balance _____ water.

which has been admixed with increasing quantities of mono-ethylene-glycol.

While purification of the gaseous mixture stops at about 1000 cc. CO per normal cubic meter when using the cupro-ammoniacal solution as such, it is found that the first small additions of glycol already suffice to produce considerable improvements in purification, an addition between 10 and 20% glycol being sufficient to bring the CO down to 5 to 20 cc. per normal cubic meter, which is the degree of purity required by modern plants for the synthesis of ammonia.

Successive additions of glycol further improve the degree of purification but, as will be clear from the diagram, the improvement progresses more slowly and in an asymptotic form.

Laboratory tests and industrial experiments have disclosed inter alia an unexpected result, namely the addition of the abovementioned substances of an alcoholic nature is more effective on the last absorption stage, that is, on the elimination of the last CO traces. Special research work was carried out to confirm this discovery.

Figure 2:
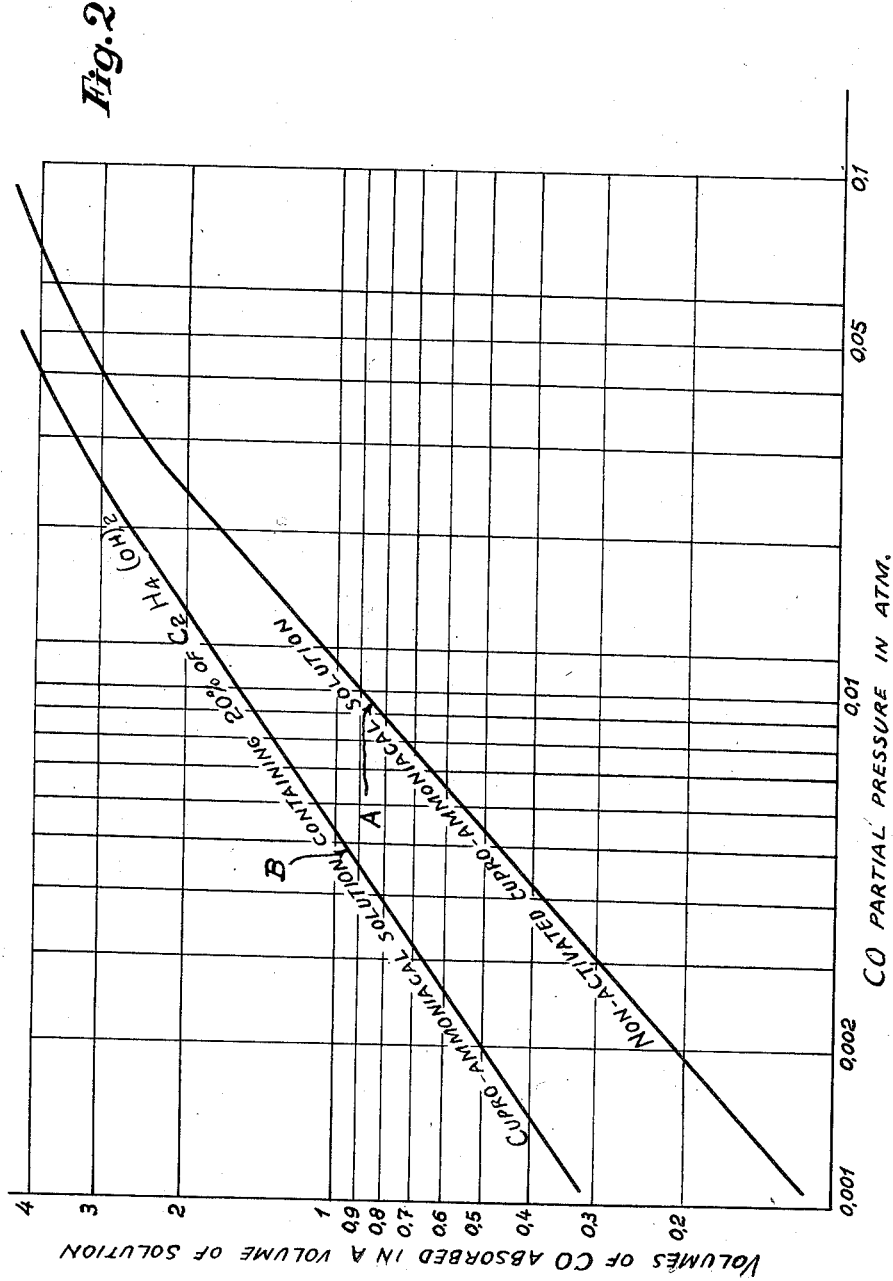

The diagram shown by Figure 2 shows the comparative results relating to the use of a cupro-ammoniacal solution as such (curve A) and the same solution admixed with 20% glycol (curve B). The partial CO pressure in atmospheres is given as abscissae, the CO volumes absorbed by each volume of solution being given as ordinates. It will be seen that, as far as concerns the CO volumes absorbed by each liquid volume, the glycol containing solution gives higher values than the solution as such, this superiority increasing as absorption is carried out by means of gaseous mixtures in which the CO content, more particularly the CO partial pressure gradually decreases.

For instance, I have ascertained that with the CO partial pressures in the mixture taking the values of 1.0; 0.1; 0.01; and 0.0017 atm., the CO-quantity absorbed by a cupro-ammoniacal solution containing 20% of glycol exceeds by 12%; 30%; 78% and 150%, respectively, the volume of CO absorbed at the above partial pressures by an identical cupro-ammoniacal solution containing no glycol.

Figure 3:
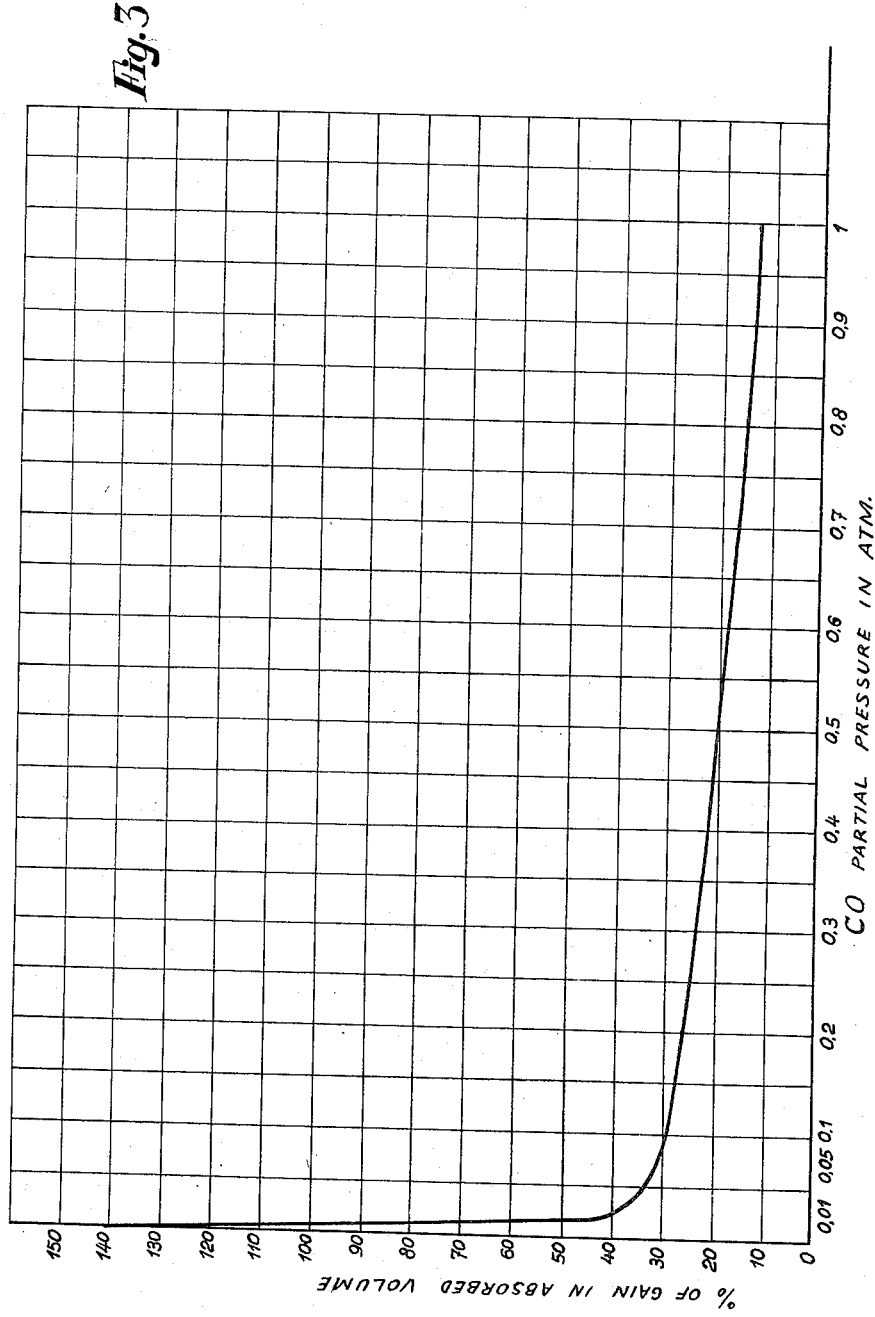

These results are graphically shown on the diagram of Figure 3, in which the CO partial pressure in atmospheres is given as abscissae, the percentage of increase of the absorbed volumes being given as ordinates.

It was further ascertained that by maintaining the washing pressure over 12 atm. indicated in diagram 1, the ultimate purification of the mixture is increasingly improved. At a pressure of 80 to 200 atm. the purification improves to a few cubic centimeters per normal cubic meter, of which the determination is rendered difficult and unreliable by the imperfection of the analytic method employed (oxidation of CO by means of iodine peroxide).

It should further be noted that the above mentioned results were obtained by effected washing with the same liquid/gas ratio (1/250) and at the same temperature of 0-3° C. as currently employed in modern plants for cupro-ammoniacal purification.

As is well known, the addition of many substances such as those mentioned above lowers the freezing temperature of the cupro-ammonical solution. Therefore, it is possible by this process to effect washing even at temperatures below 0° C., where this is thought convenient, for instance with a view to reducing losses of ammonia contained in the solution.

Regeneration of the solution is effected by any known method, for instance by heating, subjecting the solution to a vacuum or any other treatment.

An example will now be given by way of illustration of the process.

A gaseous mixture of the following composition: $H_2+N_2=95.2\%$; $CO=4\%$; $CO_2=0.8\%$ is washed in an absorption tower at a temperature of $+3°$ C. at a pressure of 12 atm. by means of a cupro-ammoniacal solution of the following composition:

| | |
|---|---|
| Total copper | 10–11 g./100 g. of the solution. |
| Bivalent copper | 2.25 g./100 g. of the solution. |
| Formic acid | 6.5 g./100 g. of the solution. |
| Ammonia | 10–11 g./100 g. of the solution. |
| Balance | water. | to which ethylene monoglycol has been admixed in a quantity sufficient to provide an amount of 10 grams of the glycol per each 100 grams of the resulting solution.

By employing a quantity of the solution equalling 1/250 volume in normal cubic meters of the treated gaseous mixture, a CO content of 5 to 10 cc. per normal cubic meter was obtained at the outlet from absorption.

Regeneration of the solution is effected by heating to 75–80° C. in the known manner.

What I claim is:

1. Process for purifying a gaseous mixture from its carbon monoxide contents by washing with a cupro-ammoniacal solution, comprising admixing the solution with at least one organic compound of an alcoholic character, and utilising the solution for washing the gaseous mixture to be purified.

2. Process as claimed in claim 1, wherein the organic compound is selected from the group consisting of: methyl and ethyl alcohol, glycol and glycerine.

3. Process as claimed in claim 1, comprising a step of washing the gaseous mixture with the solution at a pressure of 6 to 30 atmospheres.

4. Process as claimed in claim 1, comprising a step of washing the gaseous mixture with the solution at a temperature lower than 0° C.

References Cited in the file of this patent

UNITED STATES PATENTS 1,196,101    Gaus                 Aug. 29, 1916

OTHER REFERENCES

"Handbook of Chemistry and Physics," by Chemical Rubber Publishing Co., 31st edition, 1949, pages 422, 423.